United States Patent
Biller et al.

(10) Patent No.: US 9,308,905 B2
(45) Date of Patent: Apr. 12, 2016

(54) BRAKE SYSTEM FOR MOTOR VEHICLES AND METHOD FOR OPERATING THE BRAKE SYSTEM

(75) Inventors: Harald Biller, Eschborn (DE); Stefan A. Drumm, Saulheim (DE); Marco Besier, Bad Schwalbach (DE); Steffen Linkenbach, Eschborn (DE); Christopher Scharf, Mühltal (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 29 days.

(21) Appl. No.: 14/115,792

(22) PCT Filed: Apr. 16, 2012

(86) PCT No.: PCT/EP2012/056894
§ 371 (c)(1),
(2), (4) Date: Jan. 13, 2014

(87) PCT Pub. No.: WO2012/150120
PCT Pub. Date: Nov. 8, 2012

(65) Prior Publication Data
US 2014/0152085 A1  Jun. 5, 2014

(30) Foreign Application Priority Data

| May 5, 2011 | (DE) | 10 2011 075 325 |
| May 5, 2011 | (DE) | 10 2011 075 330 |
| May 5, 2011 | (DE) | 10 2011 075 331 |
| Apr. 12, 2012 | (DE) | 10 2012 205 962 |

(51) Int. Cl.
*B60T 13/14* (2006.01)
*B60T 13/58* (2006.01)
(Continued)

(52) U.S. Cl.
CPC ............ *B60T 13/58* (2013.01); *B60T 8/4081* (2013.01); *B60T 8/441* (2013.01); *B60T 13/161* (2013.01); *B60T 13/686* (2013.01); *B60T 13/142* (2013.01); *B60T 13/588* (2013.01); *B60T 13/66* (2013.01)

(58) Field of Classification Search
CPC ..... B60T 13/142; B60T 13/588; B60T 13/66; B60T 13/686; B60T 8/4081
See application file for complete search history.

(56) References Cited

U.S. PATENT DOCUMENTS 6,446,435 B1 * 9/2002 Willmann et al. ............... 60/533
6,899,403 B2 * 5/2005 Isono et al. ..................... 303/11
(Continued)

FOREIGN PATENT DOCUMENTS

DE 195 38 794 A1 4/1997
DE 195 43 582 A1 6/1997
(Continued)

OTHER PUBLICATIONS
PCT International Search Report—Jul. 11, 2012.

*Primary Examiner* — Thomas Irvin
(74) *Attorney, Agent, or Firm* — Brinks Gilson & Lione

(57) ABSTRACT

A motor vehicle brake system actuated in brake-by-wire and fallback operating modes, having a brake master cylinder, brake circuits, a pressure medium storage vessel, a brake pedal, a separating valve for separating the brake circuit into a first section connected to the separating valve the master cylinder, and a second section connected to the separating valve and the wheel brakes. A first pressure provision device has a piston actuated by an actuator, a simulation device connected by a simulator release valve to the master cylinder for a pleasant brake pedal feel in the brake-by-wire operating mode. A first electronic control and regulating unit actuates the first pressure provision device, the separating valves and the simulator release valve. A second pressure provision device has a suction connector and a pressure connector per brake circuit being connected to the inlet of the separating valve.

16 Claims, 3 Drawing Sheets

(51) Int. Cl.
  *B60T 8/40* (2006.01)
  *B60T 8/44* (2006.01)
  *B60T 13/16* (2006.01)
  *B60T 13/68* (2006.01)
  *B60T 13/66* (2006.01)

(56) References Cited

U.S. PATENT DOCUMENTS

| | | | |
|---|---|---|---|
| 7,630,815 B2* | 12/2009 | Tanaka et al. | 701/70 |
| 7,651,176 B2* | 1/2010 | Inoue et al. | 303/114.1 |
| 8,224,545 B2* | 7/2012 | Tanaka et al. | 701/70 |
| 8,333,442 B2* | 12/2012 | Hatano et al. | 303/115.1 |
| 8,447,486 B2* | 5/2013 | Nakata et al. | 701/70 |
| 8,457,857 B2* | 6/2013 | Suda | B60T 8/4081 303/9.63 |
| 8,517,476 B2* | 8/2013 | Okano et al. | 303/167 |
| 8,840,199 B2* | 9/2014 | Hatano et al. | 303/115.2 |
| 8,911,030 B2* | 12/2014 | Ohnishi et al. | 303/115.1 |
| 8,926,027 B2* | 1/2015 | Shimada | 303/10 |
| 9,145,119 B2* | 9/2015 | Biller | B60T 8/4081 |
| 2009/0179483 A1* | 7/2009 | Hatano | 303/3 |
| 2009/0199555 A1* | 8/2009 | Hatano | 60/545 |
| 2009/0229931 A1* | 9/2009 | Baumann et al. | 188/72.2 |
| 2011/0148185 A1* | 6/2011 | Okano et al. | 303/3 |
| 2011/0241419 A1* | 10/2011 | Ohkubo et al. | 303/9.62 |
| 2012/0112525 A1* | 5/2012 | Shimada | 303/10 |
| 2012/0119566 A1* | 5/2012 | Ohnishi et al. | 303/20 |
| 2012/0193975 A1* | 8/2012 | Ishii | 303/14 |
| 2012/0326491 A1* | 12/2012 | Gotoh et al. | 303/6.01 |
| 2013/0147259 A1* | 6/2013 | Linkenbach et al. | 303/14 |
| 2014/0008965 A1* | 1/2014 | Ito et al. | 303/3 |
| 2014/0008966 A1* | 1/2014 | Hotani et al. | 303/14 |
| 2014/0028084 A1* | 1/2014 | Biller et al. | 303/9.62 |
| 2014/0110997 A1* | 4/2014 | Biller et al. | 303/9.62 |
| 2014/0152085 A1* | 6/2014 | Biller et al. | 303/10 |
| 2014/0203626 A1* | 7/2014 | Biller et al. | 303/10 |
| 2014/0225425 A1* | 8/2014 | Drumm et al. | 303/9.75 |
| 2015/0020520 A1* | 1/2015 | Feigel et al. | 60/534 |
| 2015/0021978 A1* | 1/2015 | Feigel | 303/15 |
| 2015/0025767 A1* | 1/2015 | Feigel | 701/70 |
| 2015/0035353 A1* | 2/2015 | Drumm | 303/15 |
| 2015/0061364 A1* | 3/2015 | Murayama et al. | 303/15 |
| 2015/0061854 A1* | 3/2015 | Drumm et al. | 340/453 |
| 2015/0166029 A1* | 6/2015 | Yamasaki | B60T 8/48 303/14 |
| 2015/0203083 A1* | 7/2015 | Miyazaki | B60T 8/36 605/545 |

FOREIGN PATENT DOCUMENTS

| | | |
|---|---|---|
| DE | 10 2008 010 528 A1 | 9/2008 |
| DE | 10 2009 031 392 A1 | 1/2010 |
| DE | 10 2012 205 859 A1 | 10/2012 |
| DE | 10 2012 205 861 A1 | 10/2012 |
| EP | 0 485 367 A2 | 6/1989 |
| EP | 0 436 926 A3 | 12/1990 |
| EP | WO 91/05686 | 5/1991 |
| EP | WO 00/34097 | 6/2000 |
| EP | 1 334 893 A2 | 8/2003 |
| EP | WO 2011/029812 A1 | 3/2011 |

* cited by examiner

BRAKE SYSTEM FOR MOTOR VEHICLES AND METHOD FOR OPERATING THE BRAKE SYSTEM

CROSS REFERENCE TO RELATED APPLICATIONS

This application claims priority to German Patent Application Nos. 10 2011 075 325.7, filed May 5, 2011, 10 2011 075 330.3, filed May 5, 2011, 10 2011 075 331.1, filed on May 5, 2011, 10 2012 205 962.8, filed on Apr. 12, 2012, and PCT/EP2012/056894, filed Apr. 16, 2012.

FIELD OF THE INVENTION

The invention relates to a brake system for motor vehicles and to a method for operating a brake system of this type.

BACKGROUND

Hydraulic vehicle brake systems are known which are configured as power-assisted brake systems and, in addition to a brake master cylinder which can be actuated by muscular force, to which wheel brakes are connected hydraulically and which provides pressure and volume for actuating wheel brakes, include a further, electrically controllable pressure and volume provision device which actuates the wheel brakes in a "brake-by-wire" operating mode. If the electrically controllable pressure and volume provision device fails, actuation of the wheel brakes takes place solely by way of the muscular force of the vehicle driver (non-boosted fallback operating mode).

WO 2011/029812 A1 has disclosed an electrohydraulic brake system having a brake master cylinder which can be actuated by brake pedal, a displacement simulator and a pressure provision device. In a "brake-by-wire" operating mode, the wheel brakes are loaded with pressure by the pressure provision device. In the fallback operating mode, the wheel brakes are loaded by means of the brake master cylinder which can be actuated by brake pedal with the pressure which is applied by the driver. In the previously known brake system, it is considered to be disadvantageous that, if the actuation or the drive of the electrically controllable pressure provision device fails, great brake pedal forces or brake pedal displacements have to be applied by the driver, in order to achieve sufficient service brake deceleration.

It is therefore an object of the present invention to improve a brake system of the type mentioned above in such a way that, despite the failure of the pressure provision device, the vehicle driver can comfortably achieve a sufficient service brake deceleration, wherein the availability of a brake force-boosted operating mode of the brake system is to be improved.

According to the invention, this object is achieved by way of a brake system and method as described herein.

SUMMARY AND INTRODUCTORY DESCRIPTION OF THE INVENTION

The invention is based on the concept of providing a second electrically controllable pressure provision device which includes a suction connector and a pressure connector per brake circuit, the pressure connector per brake circuit being connected to an inlet connector (that is to say, a connector which faces away from the wheel brakes) of the separating valve which is assigned to the brake circuit. In other words, the pressure connector is connected to that connector of the separating valve which is on the brake master cylinder side and is likewise connected or can be connected to the pressure space of the brake master cylinder.

One advantage of the invention lies in the fact that pressure and/or volume boosting of the brake pedal actuation which is applied by the vehicle driver can be carried out by means of the second pressure provision device.

According to one preferred embodiment of the brake system according to the invention, it includes an electrically operated adding valve per brake circuit for hydraulically connecting the first pressure provision device to the brake circuit. The adding valve is in each case arranged particularly preferably in a hydraulic connecting line between the first pressure provision device and the brake circuit or the brake circuit supply line and thus makes optional opening or closing of the hydraulic connection between the first pressure provision device and the brake circuit possible. The adding valves are particularly preferably of normally closed configuration, in order that the brake circuit is separated hydraulically from the first pressure provision device in a currentless fallback operating mode. It is preferred that an outlet connector of the separating valve and an outlet connector of the adding valve are connected hydraulically for each brake circuit. The hydraulic connection particularly preferably is placed in the brake circuit supply line.

The first electronic control and regulating unit is preferably configured for actuating the first electrically controllable pressure provision device in the sense of regulation or control of the hydraulic pressure which is output by it. Furthermore, the separating valves and adding valves and the simulator release valve of the brake system are advantageously regulated and/or controlled by the first control and regulating unit.

The brake system preferably includes an electrically operated, advantageously normally open, inlet valve and an electrically operated, advantageously normally closed, outlet valve per wheel brake for setting wheel-individual brake pressures. The inlet connectors of the inlet valves of the wheel brakes of a brake circuit are particularly preferably connected to a brake circuit supply line which is connected to an outlet connector of the separating valve which belongs to the brake circuit.

The inlet valves and outlet valves are preferably likewise actuated by the first electronic control and regulating unit.

The separating valve is in each case preferably arranged in a hydraulic connecting line between the pressure space and the brake circuit supply line and thus makes optional closing or opening of the hydraulic connection between the pressure space and the brake circuit supply line possible. The separating valves are particularly preferably of normally open configuration, in order that the brake circuits are connected hydraulically to the brake master cylinder in a currentless fallback operating mode and can thus be loaded with pressure by the vehicle driver.

According to one development of the invention, per brake circuit, the suction connector is connected to the associated pressure space, with the result that the second pressure provision device is arranged hydraulically between the pressure space and the separating valve. Pressure boosting of the pressure which is introduced by the driver can thus be carried out, with the result that the driver has to apply smaller brake pedal forces in order to achieve sufficient deceleration. The suction connector is particularly preferably connected directly to the associated pressure space, without a valve being connected in between.

According to one alternative development of the invention, per brake circuit, the suction connector is connected for volume boosting to a pressure medium container, advantageously directly without a valve being connected in between.

Here, the suction connector is preferably connected to the pressure connector via an electrically operated, advantageously normally closed, overflow valve, in order for it to be possible to discharge pressure medium from the pressure side of the second pressure provision device to the pressure medium container.

According to one preferred embodiment of the brake system according to the invention, the second pressure provision device is configured hydraulically with two or more circuits. It particularly preferably includes two or more hydraulic pumps which are driven jointly by an electric motor, the pressure connectors of the first and the second pump being connected to the inlet connector of the associated separating valve. Motor/pump assemblies of this type are known as recirculating pumps in conventional brake systems and, with a compact overall size, can generate high system pressures. The pump is therefore arranged hydraulically upstream of the separating valve per brake circuit and is particularly preferably arranged either between the corresponding pressure space of the brake master cylinder and the separating valve or the discharged volumetric flow of the pump is fed into the hydraulic connecting line between the corresponding pressure space of the brake master cylinder and the separating valve.

In order to regulate the desired pressure boosting, per brake circuit, the suction connector is preferably connected to the pressure connector via an electrically operated regulating valve which can be activated in an analog manner, that is to say, per brake circuit, a regulating valve is connected in parallel to the second pressure provision device. The desired, boosted setpoint pressure can be set per brake circuit by means of volumetric flow regulation of the regulating valves and/or rotational speed regulation of the electric motor which drives the pumps. A nonreturn valve is preferably connected in parallel to each regulating valve, which nonreturn valve makes a pressure medium flow from the pressure space of the brake master cylinder to the separating valve possible independently of the switching state of the regulating valve. The nonreturn valves allow rapid brake pressure build-up by the vehicle driver. The regulating valve is advantageously of normally open configuration, with the result that wheel brake pressure dissipation is made possible in the fallback operating mode.

According to one preferred embodiment of the brake system, the second pressure provision device includes at least four hydraulic pumps which are driven jointly by an electric motor, the pressure connectors of the pumps being connected brake circuit for brake circuit to the inlet connector of the associated separating valve. At least two pumps which are connected in parallel are therefore provided per brake circuit. The suction connectors of the third and fourth pump are connected to a pressure medium storage vessel under atmospheric pressure, advantageously directly without a valve being connected in between, with the result that additional pressure medium volume can be fed in from the pressure medium storage vessel. Volume and pressure boosting are therefore possible at the same time. Moreover, any desired pressure/displacement characteristic can be set at the brake pedal, independently of the brake circuit pressure, by means of the two pump circuits which are connected in parallel.

In order to regulate the pressure which is provided by the second pressure provision device, a pressure detection device is preferably provided which detects at least the pressure at a suction connector of the second pressure provision device, which suction connector is connected to a pressure space of the brake master cylinder.

As an alternative or in addition, per brake circuit, a pressure detection device is preferably provided which detects the pressure at the pressure connector of the second pressure provision device, in order thus for it to be possible to monitor the pressure at the inlet connector of the separating valves.

The second pressure provision device and a second electronic control and regulating unit for actuating the second pressure provision device are preferably arranged in an independent module. This makes inexpensive production of the brake system possible optionally with or without a second pressure provision device. The independent module also particularly preferably includes the pressure detection devices which are assigned to the second pressure provision device and any regulating or overflow valves which might be present and are assigned to the second pressure provision device.

In order for it to be possible to maintain the boosted fallback operating mode if the on-board electrical power system fails, the independent module is preferably supplied with energy by an independent electric energy source.

The simulation device which imparts the accustomed brake pedal feeling to the vehicle driver in the "brake-by-wire" operating mode is connected hydraulically to one of the pressure spaces of the brake master cylinder. The action of the simulation device can be switched on and off by means of the simulator release valve. In the non-boosted fallback operating mode (neither the first nor the second pressure provision device is ready for operation) and in the boosted fallback operating mode (only the first pressure provision device is ready for operation), the simulation device is advantageously switched off.

The first electrically controllable pressure provision device is preferably formed by a cylinder/piston arrangement, the piston of which can be actuated by an electromechanical actuator. An electrohydraulic actuator of this type operates particularly dynamically, very quietly and bears the numbers of load cycles which are required for brake systems without problems.

According to one preferred embodiment of the brake system according to the invention, the first electronic control and regulating unit is connected to the second electronic control and regulating unit via a data line. Via the data line, the first control and regulating unit transmits a confirmation signal to the second control and regulating unit with regard to the possibility of a pressure build-up or pressure dissipation by means of the first pressure provision device. In the case where the first pressure provision device or its actuation is faulty or it is not possible to supply power to the first pressure provision device or the separating valves, the adding valves or the simulator valve, it can be detected using the absence of a confirmation signal for the second control and regulating unit that boosting is possibly necessary by means of the second pressure provision device.

Furthermore, the brake system preferably includes at least one pressure sensor for detecting a pressure of the brake master cylinder and a pressure sensor for detecting the pressure of the first pressure provision device. Furthermore, the brake system advantageously includes a displacement or angle sensor for detecting a location or position of the first pressure provision device and a displacement or angle sensor for detecting a brake pedal actuation. The signals of the four stated sensors are processed at least by the first electronic control and regulating unit.

Balancing or fault detection for the two pressure signals is possible via the abovementioned data line between the first and second control and regulating unit, which two pressure signals are present in each case in one of the two control and regulating units and are supposed to represent the same hydraulic pressure (for example, pressure signal of the sensor for detecting the pressure of the brake master cylinder in the first control and regulating unit and pressure signal of the sensor for detecting a pressure at a suction connector of the second pressure provision device in the second control and regulating unit).

Furthermore, the invention, in which the second pressure provision device is arranged upstream of the separating valves (on the inlet side of the separating valves), has the advantage, in comparison with a brake system, in which the second pressure provision device is arranged downstream of the separating valves (that is to say on the outlet side of the separating valves and upstream of the inlet valves), of higher availability of a braking operation which is brake force-boosted and is carried out by means of the first pressure provision device. In the case where a leakage occurs in one of the connecting lines from the second pressure provision device to the remaining brake system, the separating valve of the brake circuit which is affected by the leakage can be closed in the invention, with the result that brake force boosting is nevertheless carried out by means of the first pressure provision device in the other brake circuit. In a brake system, in which the second pressure provision device is arranged downstream of the separating valves and the pressure connectors of the second pressure provision device are connected directly to the brake circuit supply lines of the inlet valves, no more pressure can be built up in the brake circuit supply line, even by the first pressure provision device, in the brake circuit which is affected by the leakage.

The invention also relates to a method for operating a brake system according to the invention.

Here, advantageously if no pressure build-up or pressure dissipation can be carried out by means of the first pressure provision device or if a malfunction is detected of one of the components which are required for the "brake-by-wire" operating mode, for example if a failure of the first electrically controllable pressure provision device or its actuation is detected, and the vehicle driver actuates the brake pedal, pressure medium is sucked by means of the second electrically controllable pressure provision device from a pressure space of the brake master cylinder or from a pressure medium container and is fed into the associated brake circuit or the associated brake circuits.

As an alternative or in addition, the brake system is monitored for a leakage in the region of the second pressure provision device and/or of the brake master cylinder. In the case of a detected leakage in one of the brake circuits, the associated separating valve is closed, with the result that the second pressure provision device and the brake master cylinder are separated from the brake circuit supply line in the brake circuit which is affected by the leakage, and a brake pressure build-up is carried out in the other brake circuit by means of the first pressure provision device.

The second pressure provision device is preferably configured as an at least two-circuit motor/pump assembly, and a regulation of the pressure medium flow which is output by the motor/pump assembly is carried out by means of a rotational speed regulation of the motor/pump assembly and/or by means of a valve flow regulation of a regulating valve which can be actuated in an analog manner and is connected in parallel to the pump of the motor/pump assembly.

BRIEF DESCRIPTION OF THE DRAWINGS

Further preferred embodiments of the invention result from the subclaims and the following description using figures, in which, diagrammatically:

DETAILED DESCRIPTION

Figure 1:
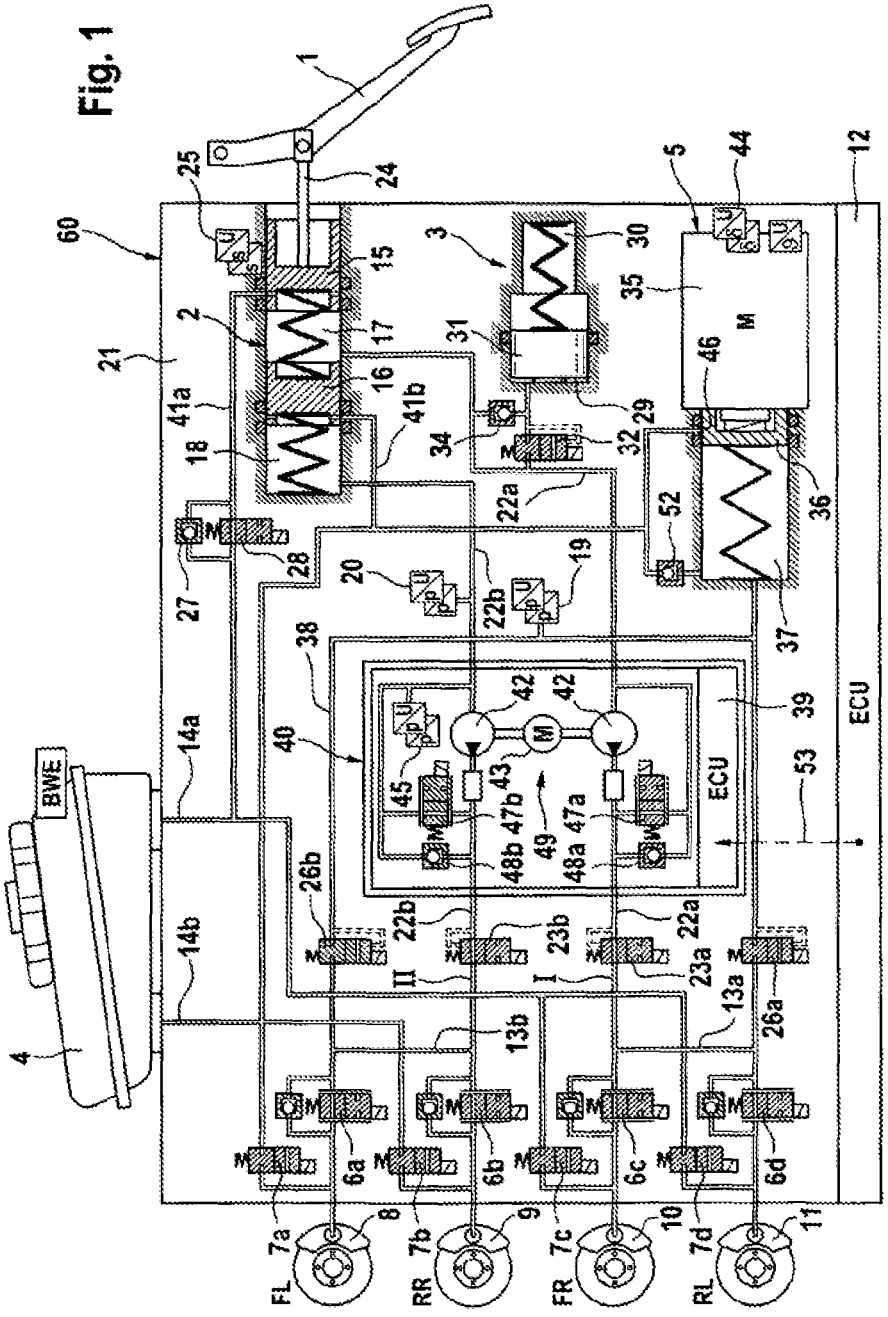
FIG. 1 shows a first exemplary embodiment of a brake system according to the invention.

FIG. 1 diagrammatically shows a first exemplary embodiment of a brake system according to the invention. The brake system substantially includes a hydraulic actuating unit 2 which can be actuated by means of an actuating or brake pedal 1, a displacement simulator or simulation device 3 which interacts with the hydraulic actuating unit 2, a pressure medium storage vessel 4 which is under atmospheric pressure and is assigned to the hydraulic actuating unit 2, a first electrically controllable pressure provision device 5, a second electrically controllable pressure provision device 49, an electronic control and regulating unit 12 and an electrically controllable pressure modulation device.

According to the example, the pressure modulation device includes, per wheel brake 8, 9, 10, 11 of a motor vehicle (not shown), an inlet valve 6a-6d and an outlet valve 7a-7d which are connected together hydraulically in pairs via central connectors and to which wheel brakes 8, 9, 10, 11 are connected. By means of brake circuit supply lines 13a, 13b, the inlet connectors of the inlet valves 6a-6d are supplied with pressures which are derived in a "brake-by-wire" operating mode from a system pressure which prevails in a system pressure line 38 which is connected to a pressure space 37 of the first electrically controllable pressure provision device 5. In each case one nonreturn valve which is not designated in further detail and opens toward the brake circuit supply lines 13a, 13b is connected in parallel to the inlet valves 6a-6d. In a non-boosted fallback operating mode, the brake circuit supply lines 13a, 13b are loaded via hydraulic lines 22a, 22b with the pressures of the pressure spaces 17, 18 of the actuating unit 2. The outlet connectors of the outlet valves 7a-7d are connected in pairs via return lines 14a, 14b to the pressure medium storage vessel 4. A pressure sensor 19 which is preferably of redundant configuration is provided for detecting the pressure which prevails in the system pressure line 38. According to the example, the wheel brakes 8 and 9 are assigned to the left-hand front wheel and the right-hand rear wheel, respectively, and the wheel brakes 10 and 11 are assigned to the left-hand rear wheel and the right-hand front wheel, respectively. Other circuit divisions are likewise conceivable.

In a housing 21, the hydraulic actuating unit 2 has two pistons 15, 16 which are arranged behind one another and delimit hydraulic chambers or pressure spaces 17, 18 which, together with the pistons 15, 16, form a two-circuit brake master cylinder or a tandem master cylinder. The pressure spaces 17, 18 are connected firstly via radial bores which are formed in the pistons 15, 16 and corresponding pressure equalizing lines 41a, 41b to the pressure medium storage vessel 4 (via the return lines 14a, 14b), it being possible for said pressure spaces 17, 18 to be shut off by way of a relative movement of the pistons 17, 18 in the housing 21, and are connected secondly via the hydraulic lines 22a, 22b and the second pressure provision device 49 to the abovementioned brake circuit supply lines 13a, 13b. Here, a parallel connection of a normally open (NO) diagnosis valve 28 with a nonreturn (check) valve 27 which closes toward the pressure medium storage vessel 4 is contained in the pressure equalizing line 41a. The pressure spaces 17, 18 accommodate restoring springs which are not denoted in greater detail and position the pistons 15, 16 in a starting position when the brake master cylinder 2 is not actuated. A piston rod 24 couples the pivoting movement of the brake pedal 1 as a consequence of a pedal actuation to the translatory movement of the first (master cylinder) piston 15, the actuating travel of which is detected by a displacement sensor 25 which is preferably of redundant configuration. As a result, the corresponding piston displacement signal is a measure of the brake pedal actuating angle. It represents a braking request of a vehicle driver. A pressure sensor 20 which is connected to the line section 22b detects the pressure which is built up in the pressure space 18 as a result of a displacement of the second piston 16.

In each case one separating valve 23a, 23b is arranged in the hydraulic connection between a pressure space 17, 18 and the associated brake circuit supply line 13a, 13b, which separating valve 23a, 23b is configured as in each case one electrically operated, preferably normally open (NO), 2/2-way valve. The hydraulic connection between the pressure spaces 17, 18 and the brake circuit supply lines 13a, 13b can be shut off by way of the separating valves 23a, 23b.

The displacement simulator 3 can be coupled hydraulically to the brake master cylinder 2 and is configured, for example, as an independent module which consists substantially of a simulator chamber 29, a simulator spring chamber 30 and a simulator piston 31 which separates the two chambers 29, 30 from one another. The simulator piston 31 is supported on the housing 21 by an elastic element (for example, a spring) which is arranged in the simulator spring chamber 30 and is advantageously prestressed. The simulator chamber 29 can be connected by means of an electrically operated simulator release valve 32 to the first pressure space 17 of the tandem brake master cylinder 2. If a pedal force is stipulated and the simulator release valve 32 is activated, pressure medium flows from the brake master cylinder pressure space 17 into the simulator chamber 29. Independently of the switching state of the simulator release valve 32, a nonreturn valve 34 which is arranged hydraulically antiparallel to the simulator release valve 32 makes it possible for the pressure medium to flow back from the simulator chamber 29 to the brake master cylinder pressure space 17 in a largely unimpeded manner.

The first electrically controllable pressure provision device 5 is configured as a hydraulic cylinder/piston arrangement or as a single-circuit electrohydraulic actuator, the piston 36 of which can be actuated by a diagrammatically indicated electric motor 35 with a likewise diagrammatically illustrated rotational/translation gear mechanism being connected in between. A merely diagrammatically indicated rotor position sensor which serves to detect the rotor position of the electric motor 35 is denoted by the designation 44. In addition, a temperature sensor can also be used for sensing the temperature of the motor winding. The piston 36 delimits a pressure space 37. Two elastomer sealing rings serve to seal the gap between the piston 36 and the pressure space wall, a connector 46 which is connected to the pressure medium storage vessel 4 ensuring drive-side wetting of the pressure-bearing elastomer sealing ring and hydraulic-side wetting of the media-separating elastomer sealing ring.

The actuator pressure which is generated by the action of force of the piston 36 on the pressure medium which is enclosed in the pressure space 37 is fed into the system pressure line 38 and is detected by way of the system pressure sensor 19. In the "brake-by-wire" operating mode, the system pressure line 38 is connected via the adding valves 26a, 26b to the brake circuit supply lines 13a, 13b. In this way, a wheel brake pressure build-up and dissipation for all wheel brakes 8, 9, 10, 11 takes place during normal braking. Here, during pressure dissipation, the pressure medium which was previously displaced from the pressure space 37 of the actuator 5 into the wheel brakes 8, 9, 10, 11 flows back on the same path into the pressure space 37 of the actuator 5 again. In contrast, in the case of a braking operation with wheel brake pressures which are regulated differently in a wheel-individual manner with the aid of the modulation valves 6a-6d, 7a-7d, the pressure medium proportion which is discharged via the outlet valves 7a-7d flows into the pressure medium storage vessel 4. Replenishing of pressure medium in the pressure space 37 is possible by way of the piston 36 being moved back when the adding valves 26a, 26b are closed, by it being possible for pressure medium to flow from the vessel 4 into the actuator pressure space 37 via a replenishing valve 52 which is configured as a nonreturn valve which opens in the flow direction to the actuator.

According to the example, the stated components 2, 3, 5, 6a-6d, 7a-7d, 12, 19, 20, 22a, 22b, 23a, 23b, 25, 26a, 26b, 27, 28, 32, 34, 38, 41a, 41b, 44, 46, 52 are combined in an electrohydraulic module which is provided with the designation 60. The electronic control and regulating unit 12 serves to actuate the electrically operated components of the module 60, in particular of the valves 23a, 23b, 26a, 26b, 28, 32 and the electric motor 35 of the first pressure provision device 5. The control and regulating unit 12 is also designed for the actuation of the pressure modulation device (inlet and outlet valves 6a-6d, 7a-7d). The signals of the sensors 19, 20, 25 and 44 are likewise processed in the electronic control and regulating unit 12.

Furthermore, the brake system includes a second electronically controllable pressure provision device 49 which is advantageously configured as an independent module (what is known as boosting module) 40. According to the example, the boosting module 40 includes a dedicated electronic control and regulating unit 39. The boosting module 40 has four hydraulic connectors, via which it is connected to the module 60. The boosting module 40 is inserted hydraulically into the lines 22a, 22b between the brake master cylinder 2 and the separating valves 23a, 23b, with the result that the pressure provision device 49 can suck pressure medium from the pressure spaces 17, 18 of the brake master cylinder 2 and can feed the pressure medium which is discharged by it via the separating valves 23a, 23b into the brake circuit supply lines 13a, 13b. In the case of a failure of the first pressure provision device 5, the second pressure provision device 49 makes the provision or boosting of a brake system pressure possible, as a result of which the availability of the brake system is improved.

According to the example, the pressure provision device 49 includes two pumps 42 which are driven jointly by an electric motor 43. The suction sides of the pumps 42 are connected directly (that is to say, without a valve being connected in between) to in each case one of the pressure spaces 17, 18, and the pressure sides of the pumps 42 are connected hydraulically in each case to the inlet-side connector of the associated separating valve 23a, 23b.

The motor/pump assembly 42, 43 is preferably configured in the manner of a piston pump 42 which is driven by the electric motor 43 via an eccentric, a design which has already been used millions of times in known brake systems as recirculating pump. Said design can generate particularly high system pressures and can be realized in a very compact overall size.

According to the example, in addition to the electronic control and regulating unit 39 and the motor/pump assembly 42, 43, the boosting module 40 includes a pressure sensor 45 which is arranged on a suction side of the pump 42 and, according to the example, is arranged in the line 22b (corresponding to brake circuit II) which belongs to the second pressure space 18, in each case one regulating valve 47a, 47b which is connected in parallel to the pump 42, can advantageously be actuated in an analog manner and is, in particular, of normally open configuration, and a nonreturn (check) valve 48a, 48b which is connected in parallel to the regulating valve 47a, 47b and opens in the direction of the wheel brakes 8, 9, 10, 11. The nonreturn valve 48a, 48b serves, above all, for a rapid brake pressure build-up by the driver. A volumetric flow from the pump pressure side to the pump suction side can be set via the regulating valves 47a, 47b.

The boosting module 40 can either be connected mechanically to the module 60 or can be constructed at a distance and connected via hydraulic lines. This also applies to the connection of the boosting module 140 and 240 of the exemplary embodiments of FIGS. 2 and 3.

The control and regulating unit 39 serves to actuate the regulating valves 47a, 47b and the electric motor 43 and to supply energy to and evaluate the signals of the pressure sensor 45. In order for it to be possible to carry out a displacement-based actuation of the second pressure provision device 49 or the module 40 even in the case of a failure of the electronic control and regulating unit 12, the displacement sensor 25 is also advantageously connected to the electronic control and regulating unit 39 of the boosting module 40 and is configured in such a way, for example in a redundant or double manner, that the displacement sensor 25 can supply a displacement signal for controlling the second pressure provision device 49 to the control and regulating unit 39 even if the control and regulating unit 12 fails. In a first operating mode, the actuation of the module 40 is based only on the pressure signals of the pressure sensor 45 of the module 40, and, in a second operating mode, it is based additionally on the pedal position (displacement sensor 25).

The control and regulating unit 39 of the module 40 is connected via at least one data line to the control and regulating unit 12, which is indicated in FIG. 1 by the dashed arrow 53, with the result that a failure of the module 60 can be detected. This also applies correspondingly to the exemplary embodiments of FIGS. 2 and 3.

In a normal braking function of the brake system ("brake-by-wire" operating mode), the brake master cylinder 2, and therefore the vehicle driver, and the second pressure provision device 49 are decoupled from the wheel brakes 8, 9, 10, 11 by way of the closed separating valves 23a, 23b, and the brake circuit supply lines 13a, 13b are connected via the open adding valves 26a, 26b to the first pressure provision device 5 which provides the system pressure for actuating the wheel brakes 8, 9, 10, 11. The simulation device 3 is switched on by the open simulator release valve 32, with the result that the pressure medium volume which is displaced in the brake master cylinder 2 by way of the actuation of the brake pedal 1 by the driver is received by the simulation device 3, and the simulation device 3 imparts an accustomed brake pedal (haptic) feeling to the vehicle driver.

In a non-boosted fallback operating mode of the brake system, for example in the case of a failure of the electric energy supply of the entire brake system (for example, modules 40 and 60), the simulation device 3 is switched off by the normally closed simulator release valve 32 and the first pressure provision device 5 is separated from the brake circuit supply lines 13a, 13b by the normally closed adding valves 26a, 26b. The brake master cylinder 2 is connected via the lines 22a, 22b with the normally open regulating valves 47a, 47b (or the nonreturn valves 48a, 48b which open in the direction of the wheel brakes) and the following normally open separating valves 23a, 23b to the brake circuit supply lines 13a, 13b and therefore the wheel brakes 8, 9, 10, 11, with the result that the vehicle driver can directly build up pressure in the wheel brakes 8, 9, 10, 11 by way of actuation of the brake pedal 1.

In a boosted fallback operating mode of the brake system (for example, in the case of a failure of the control and regulating unit 12, in the case of a failure of the electric energy supply of the control and regulating unit 12 or the module 60, or in the case of a defect of the first pressure provision device 5), the components of the module 60 remain currentless, that is to say the simulation device 3 is switched off by way of the closed simulator release valve 32, the first pressure provision device 5 is separated from the brake circuit supply lines 13a, 13b by way of the closed adding valves 26a, 26b, and the separating valves 23a, 23b are open. The brake master cylinder 2 is connected to the boosting module 40, with the result that, by means of the module 40, boosting of the driver brake actuation can be carried out and the wheel brakes 8, 9, 10, 11 can be loaded with a pressure which is boosted in comparison with the pressure which is introduced by the driver.

In order to increase the availability of the boosted fallback operating mode of the brake system, the boosting module 40 is preferably supplied by a second electric energy supply (not shown) which is independent of the electric energy supply (for example, the on-board electrical power system) which supplies the module 60 and/or the control and regulating unit 12.

By virtue of the fact that the boosting module 40 is arranged upstream of, and not downstream of, the separating valves 23a, 23b, in the case of a leakage in one of the connector lines of the module 40 (which corresponds to a leakage of the brake master cylinder), the relevant actuating circuit (that is to say, that part of the brake circuit upstream of the separating valve 23a or 23b with the leakage) can be separated by closure of the associated separating valve, with the result that that part of the brake circuit for the pressure build-up by means of the pressure provision device 5 is not affected. In the case of a leakage of this type, it is provided to maintain the brake pressure generation by way of the pressure provision device 5, but to base the driver brake request interpretation entirely or predominantly on the pedal position (displacement sensor 25) and not on the brake master cylinder pressure (pressure sensor 20).

In a brake system, in which a boosting module is arranged downstream of the separating valves 23a, 23b, in the event of a leakage of one of the two lines from the pump pressure side of the module 40 to the module 60, not only the corresponding brake circuit, but also the brake force boosting by way of the first pressure provision device 5 in the (intact) other brake circuit fail. Only the brake force boosting in the intact brake circuit by way of the pressure provision device 49 still remains possible (by way of closure of the corresponding adding valve).

A further advantage of the arrangement of the boosting module 40 upstream of the separating valves 23a, 23b consists in an increased pump volumetric flow as a result of the removal of the suction throttle for the pump 42.

Figure 2:
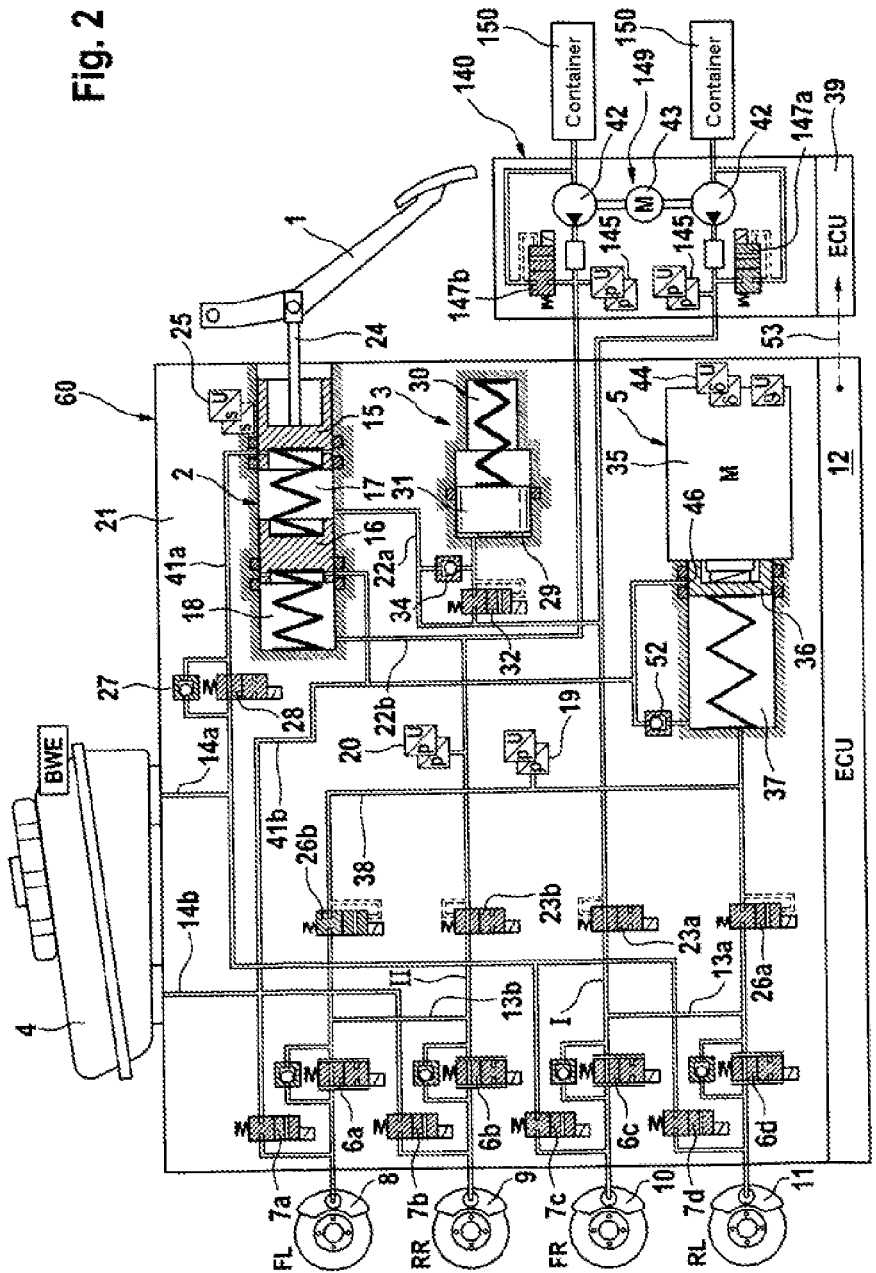
FIG. 2 shows a second exemplary embodiment of a brake system according to the invention.

FIG. 2 shows a second exemplary embodiment of a brake system according to the invention. In contrast to the first exemplary embodiment, however, a boosting module is not arranged in the hydraulic connecting lines 22a, 22b between the pressure spaces 17, 18 of the brake master cylinder 2 and the separating valves 23a, 23b, that is to say, according to the second exemplary embodiment, the pressure spaces 17, 18 are connected directly to the separating valves 23a, 23b (via the lines 22a, 22b). The brake system of the second exemplary embodiment also includes a second electronically controllable pressure provision device 149 which is arranged in an independent boosting module 140 which has a dedicated electronic control and regulating unit 39. According to the example, the pressure provision device 149 includes two pumps 42 which are driven by an electric motor 43. The boosting module 140 has two hydraulic connectors, via which each pressure side of the pumps 42 is connected to one of the connecting lines 22a, 22b (between the pressure space 17 or 18 and the separating valve 23a or 23b) of the module 60. That is to say, each pressure side of the pump 42 is connected to the inlet connector (connector on the brake master cylinder side) of the separating valve. Furthermore, the suction sides of the pumps 42 are connected to one or more pressure medium containers 150. The pressure medium container 150 can be the pressure medium storage vessel 4 or a chamber of the latter. The pressure medium container 150 can also be configured as a low pressure accumulator. The pressure provision device 149 can therefore suck pressure medium from the pressure medium container or containers 150 and feed the pressure medium which is discharged by it into the lines 22a, 22b. Volume boosting is therefore possible by way of the boosting module 140, in contrast to the boosting module 40 of the first exemplary embodiment which makes pressure boosting possible. The boosting module 140 of the second exemplary embodiment is also arranged upstream of the separating valves 23a, 23b.

According to the example, in addition to the electronic control and regulating unit 39 and the motor/pump assembly 42, 43, the boosting module 140 includes, per pump circuit, a pressure sensor 145 which is arranged on the pressure side of the pump 42 and an overflow valve 147a, 147b which is connected in parallel to the pump 42 and is, in particular, of normally closed configuration. By means of the overflow valves 147a, 147b, pressure medium can be discharged from the pressure side of the pump 42 to the container 150.

Optionally, in each case one further solenoid valve (not shown) can be arranged in the hydraulic connections between the pressure side of the pump 42 and the connecting line 22a, 22b.

Figure 3:
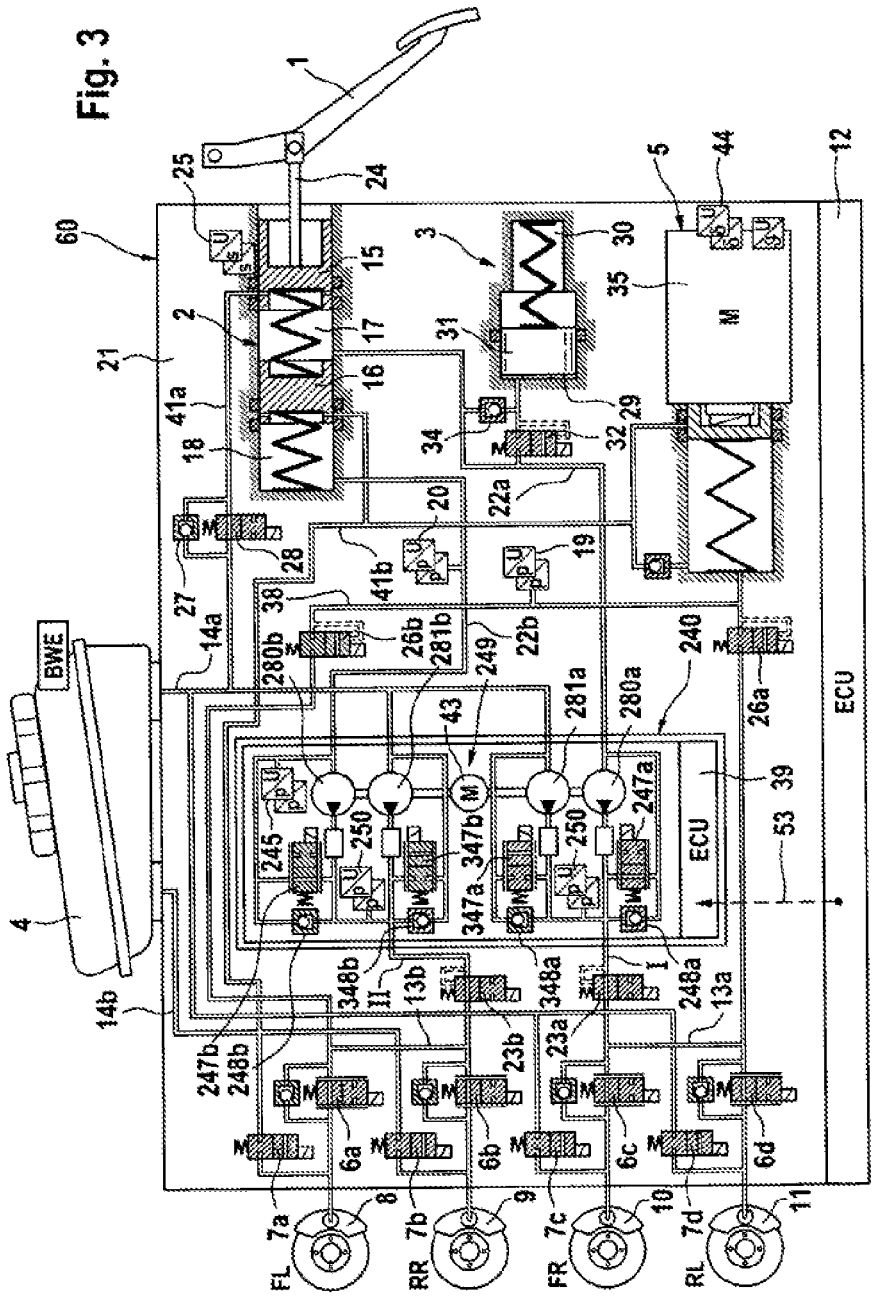
FIG. 3 shows a third exemplary embodiment of a brake system according to the invention.

FIG. 3 shows a third exemplary embodiment of a brake system according to the invention, the components of which correspond substantially to the first exemplary embodiment with regard to the module 60. The brake system of the third exemplary embodiment also includes a second electronically controllable pressure provision device 249 which is arranged in an independent boosting module 240 which has a dedicated electronic control and regulating unit 39. According to the example, the pressure provision device 249 includes four pumps 42 which are driven by an electric motor 43 (denoted individually by 280a, 280b, 281a, 281b), for example a four-piston pump. Here, for each brake circuit I, II, a pump 280a, 280b according to the first exemplary embodiment is arranged between the brake master cylinder pressure space 17, 18 and the separating valve 23a, 23b and a further pump 281a, 281b is arranged between the pressure medium storage vessel 4 and the separating valve 23a, 23b. The suction sides of the two pumps 280a, 280b are connected directly to the two pressure spaces 17, 18 of the brake master cylinder (via the lines 22a and 22b, respectively), and the suction sides of the two pumps 281a, 281b are connected directly via a common connecting line to the pressure medium storage vessel 4 (according to the example, via the return line 14a or, as an alternative, via two separate suction lines which lead to different container chambers (not shown).

The pressure sides of the pumps 280a, 281a; 280b, 281b are in each case connected brake circuit for brake circuit (I, II) jointly to the inlet connector of the associated separating valve 23a, 23b. A pressure provision device having a pump arrangement with six pumps which is driven by an electric motor 43 is likewise conceivable, two pumps which suck from the brake master cylinder being connected in parallel, for example, per brake circuit and the third pump sucking from the container.

According to the example, the boosting module 240 includes, per pump 280a, 280b, a regulating valve 247a, 247b which is connected in parallel to the pump 42, can advantageously be actuated in an analog manner, and is, in particular, of normally open configuration, and a nonreturn valve 248a, 248b which is connected in parallel to the regulating valve 247a, 247b and opens in the direction of the wheel brakes 8, 9, 10, 11. An overflow valve 248a, 248b which can advantageously be actuated in an analog manner and is, in particular, of normally closed configuration is connected in parallel to each pump 281a, 281b, in each case one nonreturn valve 348a, 348b which opens in the direction of the wheel brakes 8, 9, 10, 11 being connected in parallel to the overflow valve 248a, 248b. A volumetric flow from the pump pressure side to the pump suction side can be set via the valves 247a, 247b, 248a, 248b. By means of the regulating valves 247a, 247b which are connected to the brake master cylinder, the driver's pressure (the pedal force) is boosted, and additional pressure medium volume is fed into the two brake circuits I, II by means of the overflow valves 248a, 248b, as a result of which a brake pressure can also be built up independently of the driver. The boosting module 240 therefore represents a boosting and pressure provision module.

According to the example, the boosting module 240 includes, per brake circuit I, II, a pressure sensor 245 which is arranged on the suction side of the pump 280b and a pressure sensor 250 which is arranged on the pressure side of the pumps.

The control and regulating unit 39 of the module 240 reads in the signals of the pressure sensors 245, 250 of the module 240 and optionally the signals of the pedal position sensor 25 and actuates the electric motor 43 and the valves 247a, 247b, 248a, 248b of the module 240. As has already been explained in conjunction with the first exemplary embodiment, in a first operating mode, the actuation of the module 240 is based only on the pressure signals of the pressure sensors of the module 240 and, in a second operating mode, it is based additionally on the pedal position, for which reason the displacement sensor 25 is advantageously also connected to the electronic control and regulating unit 39 of the boosting module 240 and is configured in such a way, for example in a redundant or double manner, that it can supply a displacement signal for controlling the second pressure provision device 49 to the control and regulating unit 39 even in the event of failure of the control and regulating unit 12.

The module 240 makes the provision or boosting of a brake system pressure with simultaneous volume boosting possible in the case of a failure of the module 60. The availability of the brake system is therefore improved.

One advantage of the third exemplary embodiment lies in the fact that simultaneous volume and pressure boosting is possible, and that the driver's pressure in the brake master cylinder 2 can be set independently of the brake circuit pressure. It is therefore possible, in the boosted fallback operating mode, to achieve a system characteristic with regard to the relationship of pedal travel, pedal force and vehicle deceleration, which system characteristic corresponds to that of the "brake-by-wire" operating mode (any desired pressure/displacement characteristic of the brake pedal).

Since the boosting module is also arranged upstream of the separating valves according to the second and third exemplary embodiments, in the case of a leakage of one of the connecting lines of the module, the relevant actuating circuit (that is to say, that part of the brake circuit upstream of the separating valve 23a or 23b with the leakage) can be separated by closure of the associated separating valve, with the result that that part of the brake circuit for the pressure build-up by means of the pressure provision device 5 is not affected. In the case of a leakage of this type, it is also provided in these exemplary embodiments to maintain the brake pressure generation by way of the pressure provision device 5, but to base the driver brake request interpretation entirely or predominantly on the pedal position (displacement sensor 25) and not on the brake master cylinder pressure (pressure sensor 20). A further advantage also lies in the fact here that an increased pump volumetric flow is achieved as a result of the removal of the suction throttle for the pump 42, since the boosting module is arranged upstream of the separating valves 23a, 23b.

While the above description constitutes the preferred embodiment of the present invention, it will be appreciated that the invention is susceptible to modification, variation, and change without departing from the proper scope and fair meaning of the accompanying claims.

The invention claimed is:

1. A brake system for motor vehicles, which brake system can be actuated in a brake-by-wire operating mode both by the vehicle driver and independently of the vehicle driver, and is preferably operated in the brake-by-wire operating mode, and can be operated in at least one fallback operating mode, the brake system comprising;
   a brake master cylinder with a housing and two pistons which delimit two pressure spaces in the housing, the pressure spaces each assigned to one of two brake circuits, each of the two brake circuits having associated wheel brakes,
   a pressure medium storage vessel for storing a pressure medium with at least two chambers which are assigned to the two brake circuits,
   a brake pedal which is coupled to the brake master cylinder for actuating the brake master cylinder,
   an electrically operable normally open, separating valve assigned to each of the two brake circuits for separating each corresponding brake circuit into two sections including a first section, the first section being connected to an inlet connector of the separating valve and being connected to the brake master cylinder, and a second section, the second section being connected to an outlet connector of the separating valve and being connected to an inlet valve of each of the wheel brakes associated with the corresponding brake circuit,
   a first electrically controllable pressure provision device in the form of a cylinder and a piston arrangement, the piston actuated by an electromechanical actuator,
   a simulation device hydraulically connectable by means of an electrically actuatable simulator release valve to at least one of the pressure spaces of the brake master cylinder, wherein the simulation device imparts a haptic brake pedal feeling to the vehicle driver in the brake-by-wire operating mode,
   a first electronic control and regulating unit for actuating the first pressure provision device, the separating valves, and the simulator release valve, and
   a second electrically controllable pressure provision device having a suction connector and a pressure connector for each of the two brake circuits, the pressure connector being connected to the inlet connector of the separating valve which is assigned to the brake circuit corresponding to the pressure connector.

2. The brake system as claimed in claim 1 further comprising in that a pressure detection device that detects the pressure of the pressure medium at a suction connector of the second pressure provision device, which suction connector is connected to one of the pressure spaces of the brake master cylinder.

3. The brake system as claimed in claim 1, wherein for each of the two brake circuits, the suction connector is connected to a pressure medium container directly without a valve being connected in between.

4. The brake system as claimed in claim 3, wherein for each of the two brake circuits, the suction connector is connected to the pressure connector via an electrically operated normally closed, overflow valve.

5. The brake system as claimed in claim 1 wherein the second pressure provision device comprises at least two hydraulic pumps which are driven by an electric motor, and pressure connectors of the first and the second pump are connected to the inlet connector of the associated separating valve.

6. The brake system as claimed in claim 1 wherein the second pressure provision device comprises at least four hydraulic pumps which are driven by an electric motor, and pressure connectors of the pumps are connected to the inlet connector of the associated separating valve.

7. The brake system as claimed in claim 6, wherein the suction connectors of a third and a fourth pump of the four pumps are connected to the pressure medium storage vessel under atmospheric pressure directly without a valve being connected in between.

8. The brake system as claimed in claim 1 further comprising, for each of the two brake circuits, a pressure detection device that detects the pressure at the pressure connector of the second pressure provision device.

9. The brake system as claimed in claim 1 further comprising an electrically operated normally closed, adding valve for each of the two brake circuits for hydraulically connecting the first pressure provision device to the brake circuit, an outlet connector of the separating valve and an outlet connector of the adding valve being connected via the brake circuit second section for each brake circuit.

10. The brake system of claim 1, wherein, for each of the two brake circuits, the suction connector of the second pressure provision device is connected via a hydraulic connection to the pressure space, with the result being the second pressure provision device is arranged hydraulically between the pressure space and the separating valve.

11. The brake system of claim 10, wherein, for each of the two brake circuits, the suction connector of the second pressure provision device is connected via the hydraulic connection to the pressure space directly without a valve being connected in between.

12. A brake system for motor vehicles, which brake system can be actuated in a brake-by-wire operating mode both by the vehicle driver and independently of the vehicle driver, and is preferably operated in the brake-by-wire operating mode, and can be operated in at least one fallback operating mode, the brake system comprising;
   a brake master cylinder with a housing and two pistons which delimit two pressure spaces in the housing, the pressure spaces each assigned to one of two brake circuits, each of the two brake circuits having associated wheel brakes, a pressure medium storage vessel for storing a pressure medium with at least two chambers which are assigned to the two brake circuits, a brake pedal which is coupled to the brake master cylinder for actuating the brake master cylinder, an electrically operable normally open, separating valve assigned to each of the two brake circuits for separating each corresponding brake circuit into two sections including a first section, the first section being connected to an inlet connector of the separating valve and being connected to the brake master cylinder, and a second section, the second section being connected to an outlet connector of the separating valve and being connected to the wheel brakes associated with the corresponding brake circuit, a first electrically controllable pressure provision device in the form of a cylinder and a piston arrangement, the piston actuated by an electromechanical actuator, a simulation device hydraulically connectable by means of an electrically actuatable simulator release valve to at least one of the pressure spaces of the brake master cylinder, wherein the simulation device imparts a haptic brake pedal feeling to the vehicle driver in the brake-by-wire operating mode, a first electronic control and regulating unit for actuating the first pressure provision device, the separating valves, and the simulator release valve, and a second electrically controllable pressure provision device having a suction connector and a pressure connector for each of the two brake circuits, the pressure connector being connected to the inlet connector of the separating valve which is assigned to the brake circuit corresponding to the pressure connector;

wherein for each of the two brake circuits, the suction connector of the second pressure provision device is connected to the pressure space directly without a valve being connected in between, with the result that the second pressure provision device is arranged hydraulically between the pressure space and the separating valve.

13. The brake system as claimed in claim 12, wherein for each of the two brake circuits, the suction connector is connected to the pressure connector via an electrically actuatable normally open, regulating valve being activatable in an analog manner and the suction connector being further connected with a nonreturn valve connected in parallel wherein a flow of the pressure medium from the pressure space of the brake master cylinder to the separating valve will occur independent of the switching state of the regulating valve.

14. The brake system as claimed in claim 13 wherein the second pressure provision device, the regulating valves, and a second electronic control and regulating unit for actuating the second pressure provision device are arranged in an independent module.

15. A method for operating a brake system comprising the steps of:

providing a brake system comprising:

a brake master cylinder with a housing and two pistons which delimit two pressure spaces in the housing, which pressure spaces are assigned to one of two brake circuits, each of the two brake circuits having associated wheel brakes, a pressure medium storage vessel for a pressure medium with at least two chambers assigned to the two brake circuits, a brake pedal coupled to the brake master cylinder for actuating the brake master cylinder, an electrically operated normally open, separating valve for each of the two brake circuits for separating the brake circuits into two sections including a first section being connected to an inlet connector of the separating valve and further being connected to the brake master cylinder, and a second section being connected to an outlet connector of the separating valve being and being connected to an inlet valve of each of the wheel brakes associated with the corresponding brake circuit, a first electrically controllable pressure provision device in the form of a cylinder and a piston arrangement, the piston of which being actuatable by an electromechanical actuator, a simulation device being hydraulically connectable by means of an electrically actuatable simulator release valve to at least one pressure space of the brake master cylinder the simulation device imparting a brake pedal haptic feeling to the vehicle driver in the brake-by-wire operating mode, and a first electronic control and regulating unit for actuating the first pressure provision device, the separating valves and the simulator release valve, a second electrically controllable pressure provision device having a suction connector and a pressure connector for each of the two brake circuits, the pressure connector for each of the two brake circuits being connected to the inlet connector of the separating valve assigned to the brake circuit corresponding to the pressure connector, suctioning the pressure medium by means of the second electrically controllable pressure provision device from one of the pressure spaces of the brake master cylinder or from a pressure medium container and;

feeding the pressure medium into at least one of the brake circuits, if no pressure build-up or dissipation can be carried out by means of the first pressure provision device and the brake pedal is actuated.

16. The method for operating a brake system as claimed in claim 15, wherein the brake system is monitored for a leakage in a region of the second pressure provision device or of the brake master cylinder, and in response to detecting a leakage in one of the two brake circuits, closing the associated separating valve and carrying out a brake pressure build-up in the other of the brake circuits by means of the first pressure provision device.

* * * * *

UNITED STATES PATENT AND TRADEMARK OFFICE
CERTIFICATE OF CORRECTION

| | | |
|---|---|---|
| PATENT NO. | : 9,308,905 B2 | Page 1 of 1 |
| APPLICATION NO. | : 14/115792 | |
| DATED | : April 12, 2016 | |
| INVENTOR(S) | : Biller et al. | |

It is certified that error appears in the above-identified patent and that said Letters Patent is hereby corrected as shown below:

<u>In the Claims</u>

Column 2, line 6, claim 2, after "comprising", delete "in that".

Signed and Sealed this
Twenty-eighth Day of June, 2016

Michelle K. Lee
*Director of the United States Patent and Trademark Office*